United States Patent [19]

Hope et al.

[11] Patent Number: 5,102,752

[45] Date of Patent: Apr. 7, 1992

[54] SOLID STATE COMPOSITE ELECTROLYTE FOR BATTERIES

[76] Inventors: Henry F. Hope; Stephen F. Hope, both of c/o Hope Industries, Inc., Willow Grove, Pa. 19090

[21] Appl. No.: 568,170

[22] Filed: Aug. 16, 1990

[51] Int. Cl.⁵ .......................................... H01M 10/40
[52] U.S. Cl. .................................. 429/192; 252/62.2
[58] Field of Search ...................... 429/192; 252/62.2

[56] References Cited

U.S. PATENT DOCUMENTS

| | | | |
|---|---|---|---|
| 4,654,279 | 3/1987 | Bauer et al. | 429/192 |
| 4,792,504 | 12/1988 | Schwab et al. | 429/192 |
| 4,822,701 | 4/1989 | Ballard et al. | 429/192 |
| 4,830,939 | 5/1989 | Lee et al. | 429/192 |
| 4,849,311 | 7/1989 | Itoh et al. | 429/192 |

Primary Examiner—Stephen Kalafut
Attorney, Agent, or Firm—Z. T. Wobensmith, III

[57] ABSTRACT

A solid state polymer electrolyte composite which is formed by impregnating an electrically non-conductive fibrous net with a liquid, ion-conductive polymer, and curing the polymer to form a solid state or semi-solid state electrolyte composite.

15 Claims, No Drawings

SOLID STATE COMPOSITE ELECTROLYTE FOR BATTERIES

BACKGROUND OF THE INVENTION

1. Field of the Invention

This invention relates to solid state electrolyte composites which contain an electrically insulating fibrous structure saturated with an ion conductive, solid state matrix, crosslinked by an alkaline metal triflate salt, or by the alkaline metal triflate salt and a radiation curable polymer.

2. Description of the Prior Art

In the prior art various polymers have been used as components of the electrolytes of solid state alkaline and alkaline earth metal batteries and various other kinds of batteries.

Among the problems associated with these polymers is that they have inherent relatively low ionic conductivity, and also may react with the alkaline metals used, such as lithium, or other metallic anodes, to form a non-conductive boundary layer, which prevents the free flow of ions and hinders rechargeability.

The prior art polymer containing electrolytes also have exhibited poor aherence to the electrodes, are not flexible and do not possess sufficient mechanical strength to prevent shorting under pressure, or punching through of dendrites and consequent shorting of the battery.

The solid state polymer composite electrolytes of the invention do not suffer from the prior art problems and provide many positive advantages.

SUMMARY OF THE INVENTION

It has now been found that, solid state electrolytes which are highly ion conductive, shorting-proof, dendrite-proof, flexible yet mechanically strong, inert to battery component materials, can be made by using composite construction, where a liquid, ion conductive matrix is solidified by using an alkaline triflate salt such as lithium triflate salt with polyethylene oxide (PEO) alone or with a radiation curable polymer, which is impregnated in an electrically insulating, fibrous and porous material, preferrably a net or layer of non-woven, fabric.

Fabrics or papers made of Kevlar aramid, polypropylene; polyethlene, silk and other electrically insulating fibers which are inert to alkaline metals and are saturable are also useful.

The principal object of the invention is to provide a solid or semi-solid state composite polymer electrolyte for batteries.

A further object of the invention is to provide an electrolyte of the character aforesaid that is inert to battery component materials.

A further object of the invention is to provide an electrolyte of the character aforesaid that has excellent adherence and low shrinkage properties.

A further object of the invention is to provide an electrolyte of the character aforesaid, that is flexible, tough and resistant to dendrite formation, but is easy to handle and produce.

A further object of the invention is to provide an electrolyte of the character aforesaid that is mechanically strong and resists shorting under pressure.

A further object of the invention is to provide an electrolyte of the character aforesaid that is highly stable at elevated temperatures, and allows rapid processing.

Other objects and advantageous features of the invention will be apparent from the description and claims.

DESCRIPTION OF THE PREFERRED EMBODIMENTS

Batteries such as alkaline or alkaline earth metal batteries, and for example lithium batteries, consist of at least an anode layer, a polymer electrolyte layer, and a cathode layer. Such batteries can be of virtually any desired size and configuration, and usually include additional layers such as current conducting backing layers, insulating layers and electrode connection layers.

The polymer dilectric or electrolyte layer must be compatible with the component materials used to fabricate the batteries while possessing suitable ionic conductivity.

In the described battery a base (not shown) is provided which can be a web of material such as nickel foil or carbon fibres coated with a cathode material as described in our prior U.S. Pat. No. 4,794,059.

The cathode may then have an additional layer (not shown) of solid state polymeric electrolyte composite applied thereto, which composite may include an electrically non-conductive fibrous layer or net which has been impregnated with polymeric material such as polyethylene oxide and propylene carbonate compounded with lithium trifluoromethane sulfonate, and which is also referred to as lithium triflate.

An additional layer (not shown) of anode material is applied on top of the electrolyte layer, which is a base layer of carbon fibers coated with alkaline metal as described in our prior U.S. Pat. No. 4,794,059, or an alkaline metal foil or an alkaline metal foil rolled onto a net of carbon fibres to form an anode layer, (not shown).

The resultant battery can be provided with other layers as desired.

The solid state polymeric electrolyte composition which is suitable, for example, for lithium batteries, contains propylene carbonate (PC) in the range of 20% to 90% by weight, 1,2-dimethoxyethane (DME) in the range of 4% to 69% by weight, an ion conductive salt, lithium triflate in the range of 1% to 30% by weight, and polyethylene oxide (PEO) in the range of 0.2% to 60% by weight, and an optional radiation curable polymer in the range of 2% to 60% by weight. The PC can be replaced by polyethylene glycol dimetyl ether (PEGDME) or butylene carbonate or a pyrrolidinone of the same percent weight range. The described composition is heated to 70° C. and soaked into an electrically non-conductive fibrous net, and then solidified by cooling to 27° C. or less and by the presence of lithium triflate as described in our prior U.S. patent application Ser. No. 07/572,253 filed Aug. 27, 1990. If radiation curable polymer is also used, the impregnated composite is irradiated by UV light, or electron beam radiation before cooling as described in our prior U.S. Pat. No. 5,006,531.

It should be noted that, for other alkaline metal batteries, the lithium triflate salt should be replaced by a corresponding triflate salt to match the elected alkaline metal.

Preferred embodiments of the invention are illustrated in the following examples:

EXAMPLE #1

A sample of polymeric electrolyte composite was formed by compounding a lithium salt and a polymeric material which consisted of 42.75% (percent) by weight of propylene carbonate (PC), 42.75% (percent) by weight of 1,2 dimethoxyethane (DME), 11% (percent) by weight of lithium triflate and 3.5% (percent) by weight of polyethylene oxide (PEO).

The mixture was heated to 70° C. and became liquid, a fibrous nonwoven net of Nomex aramid fabric was impregnated with the hot liquid. The hot impregnated fabric was applied to an electrode layer, and by cooling it to 27° C. or less it solidified due to the presence of the lithium-triflate and formed a solid or semi-solid, ion conductive layer of desired thickness, strength and adherence.

EXAMPLE #2

Another sample of polymeric electrolyte composite was formed by compounding a lilthium salt and a polymeric material which consisted of 36.6% (percent) by weight of PC, 36.6% (percent) by weight of DME, 10% (percent) by weight of lithium triflate, 1.8% (percent) by weight of PEO and 15% (percent) by weight of a radiation curable polymer such as Envibar UV-1244.

The mixture was heated to 70° C. and became liquid, a net of fibrous non-woven Nomex aramid fabric was impregnated with the hot mixture. The hot impregnated fabric was applied to an electrode layer and exposed to ultraviolet radiation while still hot, which caused it to crosslink. The composite was then cooled to 27° C. or less and formed a solid or semi-solid ion conductive layer of desired thickness, strength and adherence.

It should, of course, be understood that the description is merely illustrative and that various modifications and changes can be made in the structure disclosed without departing from the spirit of the invention.

It is thus apparent that the objects of the invention have been achieved.

We claim:

1. A polymeric solid state electrolyte composite for batteries wherein the electrolyte composite consists of an inert electrically insulating net of porous fiber material which has been impregnated with and is embedded in an ionically conductive solid state matrix.

2. A composite as defined in claim 1 in which said net is of plastic.

3. A composite as defined in claim 1 in which said net is of Nomex aramid fiber.

4. A composite as defined in claim 1 in which said net is of an aramid fiber.

5. A composite as defined in claim 1 in which said net is of polypropylene fiber.

6. A composite as defined in claim 1 in which said net is of polyethylene fiber.

7. A composite as defined in claim 1 in which said net is of polyester fiber.

8. A composite as defined in claim 1 in which said net is of silk.

9. A composite as defined in claim 1 in which said solid state matrix is formed from an ion conductive liquid which has been complexed and cross-linked with an alkaline metal or alkaline earth metal trifluoromethane sulfonate, and polyethylene oxide.

10. A composite as defined in claim 9 in which said alkaline metal triflate is lithium trifluormethane sulfonate.

11. A composite as defined in claim 9 in which said matrix additionally contains a radiation curable polymer.

12. A composite as defined in claim 9 in which said matrix contains propylene carbonate and 1,2 Dimethoxyethane.

13. A composite as defined in claim 9 in which said matrix contains polyethylene glycol dimethyl ether.

14. A composite as defined in claim 9 in which said matrix contains butylene carbonate.

15. A composite as defined in claim 9 in which said matrix contains pyrrolidinone.

* * * * *